(12) United States Patent
Cord

(10) Patent No.: US 7,155,115 B2
(45) Date of Patent: Dec. 26, 2006

(54) METHOD AND DEVICE FOR VACUUM SPUTTERING

(75) Inventor: Bernhard Cord, Alzenau (DE)

(73) Assignee: OC Oerlikon Balzers AG, Furstentum (LI)

( * ) Notice: Subject to any disclaimer, the term of this patent is extended or adjusted under 35 U.S.C. 154(b) by 51 days.

(21) Appl. No.: 10/119,541

(22) Filed: Apr. 9, 2002

(65) Prior Publication Data

US 2003/0175422 A1    Sep. 18, 2003

(30) Foreign Application Priority Data

Mar. 15, 2002  (DE) ............................... 102 11 573

(51) Int. Cl.
*C23C 14/24* (2006.01)
*C23C 14/54* (2006.01)

(52) U.S. Cl. ..................... 392/389; 392/400; 392/403; 118/726

(58) Field of Classification Search ................ 118/726; 392/400, 403, 389
See application file for complete search history.

(56) References Cited

U.S. PATENT DOCUMENTS

| | | | | | |
|---|---|---|---|---|---|
| 4,125,086 | A | * | 11/1978 | Vig et al. .................... | 118/726 |
| 4,392,453 | A | * | 7/1983 | Luscher ....................... | 118/726 |
| 4,412,508 | A | * | 11/1983 | Ney et al. .................... | 118/726 |
| 4,565,158 | A | * | 1/1986 | Koprio ........................ | 118/726 |
| 4,606,296 | A | * | 8/1986 | Gailliard et al. ............. | 118/726 |
| 5,336,324 | A | * | 8/1994 | Stall et al. ................... | 118/719 |
| 5,562,965 | A | | 10/1996 | Gui et al. .................... | 428/65.4 |
| 6,011,904 | A | * | 1/2000 | Mattord ........................ | 392/389 |
| 6,099,896 | A | | 8/2000 | Stirniman ..................... | 427/131 |
| 6,183,831 | B1 | | 2/2001 | Hughes et al. .............. | 428/65.3 |
| 6,214,410 | B1 | | 4/2001 | Stirniman et al. ........... | 427/131 |
| 6,264,751 | B1 | | 7/2001 | Kamura et al. .............. | 118/725 |
| 6,296,894 | B1 | * | 10/2001 | Tanabe et al. ................ | 427/8 |

FOREIGN PATENT DOCUMENTS

| | | |
|---|---|---|
| DE | 43 42 574 C1 | 4/1995 |
| JP | 63-310792 | * 12/1988 |
| JP | 11-172418 | 6/1999 |
| JP | 2000-087224 | 3/2000 |
| JP | 2000-313952 | 11/2000 |

* cited by examiner

Primary Examiner—Richard Bueker
(74) Attorney, Agent, or Firm—Sheridan Ross P.C.

(57) ABSTRACT

The invention concerns a device and a process for applying a lubricant by means of vapour deposition to a target object, especially a magnetic data carrier. The device in accordance with the invention comprises a lubricant supply means (1) that can be filled from outside, possibly by means of a feed line. The produced lubricant vapour (5) is expanded through one or more exit openings (6) in the direction of a target object (8) on which the vapour deposition is to be effected. The vapour at first becomes adsorbed on the walls of a cone-shaped distribution element (4) situated between the lubricant supply means (1) and the target object (8), from which it subsequently desorbs again. Said adsorption/desorption process assures an even and homogeneous vapour distribution over the target object (8). A device for interrupting the vapour supply makes it possible for the device to be operated in a discontinuous manner.

10 Claims, 2 Drawing Sheets

METHOD AND DEVICE FOR VACUUM SPUTTERING

FIELD OF THE INVENTION

The present invention concerns a vaporization device for lubricants, as well as a process for their application to a target object, for example, a hard magnetic disk or the like.

BACKGROUND OF THE INVENTION

As here used, the term lubricants (often referred to also as Tubes) is not to be understood in a narrow sense and is rather intended to describe the preferred field of application. Under no circumstances is a limitation to be associated therewith, because the invention described hereinbelow can be used also with other substances that are capable of being applied to a target object by means of vapour deposition in a vacuum, including not only all kinds of lubricants and such lubricant-like materials as antiseize, slip additives, greases, parting agents or, quite generally, any kind of slip-promoting means, but also corrosion protection films, wetting agents, adhesion improvers, etc., and the term lubricant is here used in the wide sense to describe all of these, including—of course—also the preferred field of application, with a view to obtaining a slip or lubrication effect. Consequently, whenever the term lubricant is used in the remarks that follow, it is to be understood both in the narrower sense relating to the preferred field of application and in the wider sense as discussed above.

The production of (electronic) components, especially hard magnetic disks, often calls for the application of a slip layer having the primary function of assuring that friction forces on the magnetic disk will be kept as small as possible, so that the writing/reading head of a hard-disk drive can slide smoothly over the surface of the disk without thereby either damaging the disk or limiting its functionality.

The hitherto customary method for the application of slip layers of this kind envisages the magnetic disk being dipped into a bath containing the lubricant diluted in an appropriate solvent. When this is done, the thickness of the applied layer of the lubricant is set by controlling the concentration of the lubricant or the speed with which the disk is pulled out of the bath. The need for pulling the part out of the bath, in particular, may give rise to local fluctuations of the thickness of the applied lubricant. Over and above this, there is also the problem that the surface of the magnetic disk is very liable to become contaminated before it is covered with the lubricant, so that the surrounding atmosphere has to be kept as clean as possible if a utilizable layer of lubricant is to be obtained.

With a view to limiting this contamination and, more particularly, the coverage of the surface with gas adsorbates, it has been suggested, in U.S. Pat. No. 6,183,831 B1 for example, that the entire coverage process should be carried out in a vacuum. To this end several thin films are applied to an aluminum substrate in a vacuum sputter plant, the uppermost of the films being a protective carbon layer. According to the known process, the magnetic disk prepared in this manner is then subjected to the vapour deposition of a lubricant in vacuum. This is done in a vapour-deposition chamber containing a vaporization plate on which there are provided evenly distributed small storage chambers with a supply of the lubricant that is to be vaporized. The lubricant is vaporized by heating the vaporization plate, so that it enters the vapour-deposition chamber and eventually reaches the magnetic disk situated therein. With a view to obtaining an even distribution of the deposited lubricant over the disk that is to be covered, a diffuser plate is arranged between the medium that is to be covered and the vaporization plate, said diffuser plate being provided with evenly distributed passage holes. But the known process is associated with several drawbacks. Firstly, it works or deposits continuously, that is to say, the vaporization plate is used to produce a lubricant cloud into which the disks to be coated have to be inserted one after the other and then removed again on completion of the deposition. Once the lubricant has been consumed, the vaporization plate has to be dismantled and refurnished with lubricant before the process can be continued. Furthermore, lubricant is consumed even in the period between the removal of one disk and the insertion of the next. Lastly, the diffuser plate tends to reduce the deposition rate, so that the deposition period is lengthened and the process, given the low deposition rates, becomes unsuitable for mass production.

SUMMARY OF THE INVENTION

The present invention therefore sets out to create a vacuum vaporization and vapour-deposition device that is not associated with the drawbacks explained above and is particularly distinguished by a homogeneous distribution of the lubricant over the surface of the magnetic disk.

According to the invention this aim is attained by a vacuum vaporization device for the application of lubricants to a target object under vacuum. Said device comprises the following: lubricant supply means for making a lubricant available, vaporization control means for setting the vapour pressure and/or the temperature of the lubricant, and distribution means that distribute the lubricant over the target object on which it is to be deposited. The distribution means are provided with one or more exit openings for the vaporized lubricant and at least one substantially cone-shaped distribution element that becomes larger in the direction of the object that is to be coated.

Due to the presence of the distribution element, the lubricant can be homogeneously distributed over the surface of the target object without an additional diffuser plate. Furthermore, the cone-shaped arrangement assures that the lubricant stream is always oriented in the direction of the substrate, thus increasing the efficiency. The vapour particles issuing from the distribution means will become adsorbed for a short period of time on the surface of the distribution element, after which they will desorb again. The adsorption/desorption distribution makes it possible to obtain a gapless or continuous distribution of the lubricant over the entire target object that is not exclusively determined by the available exit openings.

Furthermore, the device in accordance with the invention can also be operated in a discontinuous manner, so that lubricant vapour will issue from the vaporization device only when a target object on which it is to be deposited is effectively present. To this end an advantageous embodiment of the invention envisages the vacuum vaporization device being also provided with a device for interrupting the vapour supply. This will preferably be in the form of a valve, especially a pneumatically operated valve. Such a valve can be controlled from outside and can also be quickly opened and closed.

According to another and particularly advantageous embodiment, the lubricant supply means assumes the form of a hollow space that can be filled from outside. Consequently, the device need not be shut down or opened when it has to be replenished with lubricant, so that a considerable expenditure of time can be avoided. In particular, an external lubricant feed line can be provided for this replenishment of the lubricant supply means, so that lubricant can be made available in a wholly continuous manner.

The one or more exit openings are preferably situated at the side of a substantially cone-shaped distribution element, so that the lubricant emission will not take place directly onto the target object, but will be effected primarily due to adsorption on the distribution element and subsequent desorption therefrom. In this connection matters can also be arranged in such a way that the angle of inclination of the one or more exit openings can be varied. In this way it becomes possible for the vaporization device to be adapted to a very wide range of different geometric conditions, while the distribution of the vapour particles over the target object can be individually set and optimized in a very simple manner.

The vaporization setting means will preferably take the form of a heating device arranged in the area of the lubricant supply means. In collaboration with a temperature sensor likewise arranged in the area of the lubricant supply means, said heating device makes it possible to set a desired vapour pressure.

According to yet another advantageous embodiment, the vacuum vaporization device in Accordance with the invention is provided with a storage volume intended for the produced lubricant vapour and situated between the lubricant supply means and the exit openings. This volume, in particular, could consist of a substantially tubular connecting element. The storage volume can be used to accommodate the lubricant vapour that, though produced, has not yet been distributed onto the target object. In that case a certain quantity of vapour will always be available, especially immediately after the opening of the valve, so that the vapour deposition process can be performed very quickly and effectively even in dig continuous operation.

With a view to preventing an undesired adsorption and maintaining and producing the lubricant vapour, in particular, this embodiment is provided with one or more heating devices that heat the lubricant supply means and/or the distribution means and/or the storage volume to a predetermined temperature. The temperature of the distribution means should pro ferably be capable of being set between 25 and 300° C. Preferably, it should also be possible to make the temperature $T_{Vext}$ of the distribution means greater than the temperature $T_{VV}$ of the storage volume and the temperature $T_{VV}$ of the storage volume greater than the temperature $T_{VM}$ of the lubricant supply means. This will avoid the lubricant vapour condensing within the device. Preferably the settings will also be such that the temperature differences $T_{Vext}$-$T_{VV}$ and $T_{VV}$-$T_{VM}$ both amount to about 10° C.

The process for depositing lubricant vapour on a target object in accordance with the invention consists of the following steps: provision of a target object to be coated, production of a lubricant vapour, setting of a defined vapour pressure, production of a stream of lubricant vapour by expansion of the vaporized lubricant through one or more exit openings, production of a homogeneous vapour particle distribution over the target object by appropriately setting the angle of inclination of the one or more exit openings or/and adsorption of the vapour particles in a substantially cone-shaped distribution element that opens in the direction of the target object and their subsequent desorption therefrom.

According to an advantageous variant, the desorption is obtained by heating the distribution element. This assures that the dwell time in the distribution element will not be excessively long, thus improving the homogeneous distribution of the lubricant vapour over the target object. The homogeneity of the distribution of the vapour particles (molecules) over the target object will preferably be set by means of a predetermined angle of aperture of the distribution element.

The defined vapour pressure can be advantageously set by means of a temperature relation mechanism. A uniform vapour deposition rate can thus be obtained in a simple manner, especially in case of discontinuous operation. The employed lubricant will preferably comprise perfluoropolyether (PFPE).

According to an advantageous variant of the process, two vaporization devices are used to coat the two sides of a disk-shaped target object. This makes it possible for the two sides of the target object to be coated simultaneously, so that there is no need for providing a costly turning mechanism within the apparatus.

The invention further concerns a target object bearing a layer deposited by means of the, process in accordance with the invention. The process for the deposition of lubricants in accordance with the invention can preferably be applied to ring-shaped data storage disks, especially hard-disk storage media.

On hard disks the lubricant, especially PFPE, is preferably provided with additives (X 1P). If these were to be heated as a mixture and applied in a one-stage process, a distillation effect would be produced. According to an advantageous embodiment, the lubricant is the refore applied to the target object in a two-stage process. Given this treatment at two successive stations, the liquids in use can be selected according to their molecular weight (molecular weight distribution 1.05 rather than the customary 1.50) and this renders possible longer operating periods and constant vapour deposition rates. Furthermore, an additional degree of freedom is obtained by virtue of the fact that it becomes possible to prepare different layer thicknesses. Together with the valve function of the vaporization device, this could be also in an in-phase device.

The applied layer is preferably a lubricating layer with a preferred thickness of 1–5 nm, better still, 1.5–3 nm. The layer inhomogeneity will amount to less than 20%, preferably less than 10%, especially less than 8%.

BRIEF DESCRIPTION OF THE DRAWINGS

The invention and its advantageous embodiments will now be schematically illustrated in greater detail with the help of drawings, of which.

DETAILED DESCRIPTION

Figure 1:
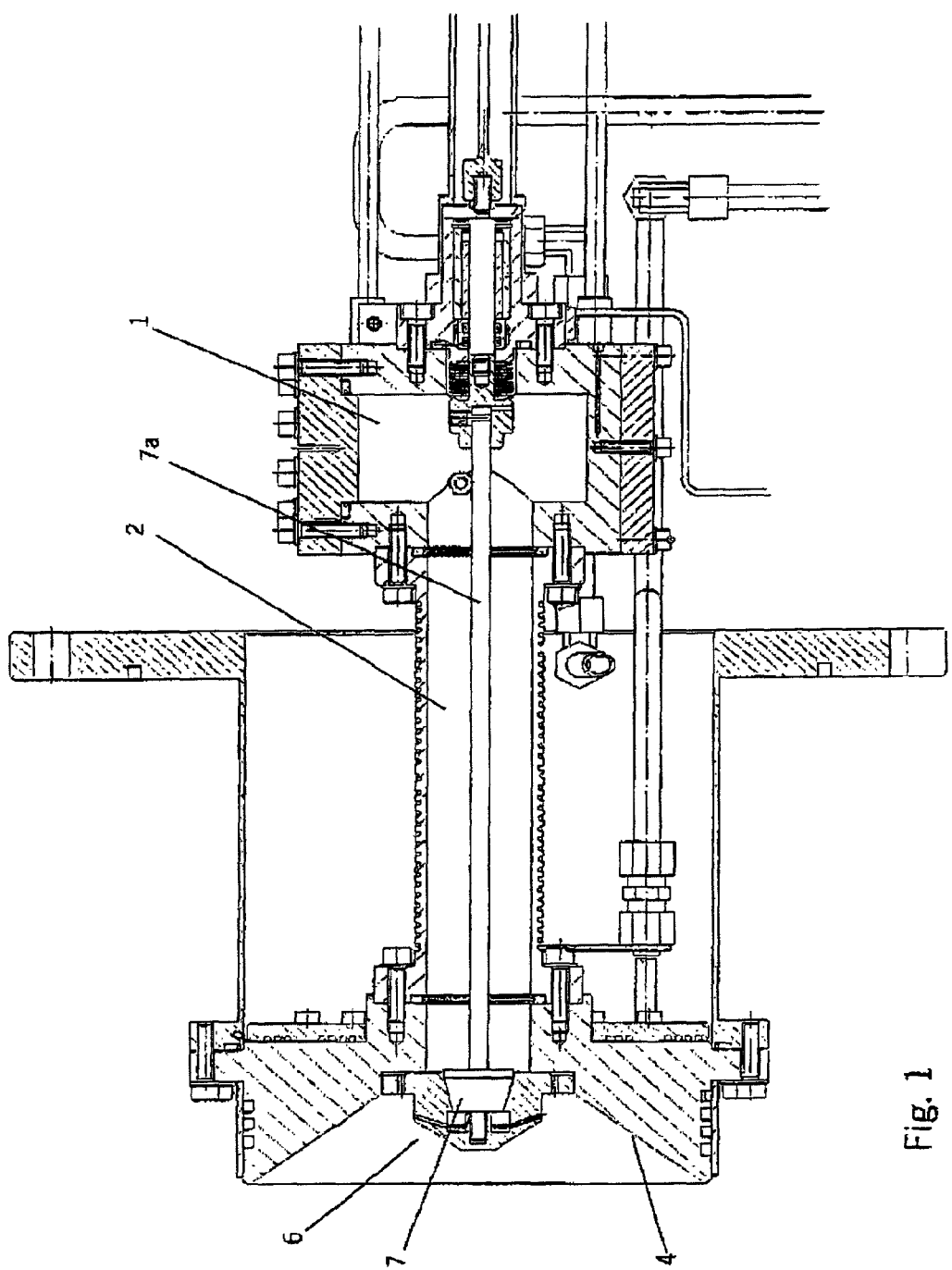
FIG. 1 shows a section through an embodiment of the vacuum vaporization device in accordance with the invention.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated."

FIG. 1 shows a section that schematically illustrates the structure of the vacuum vaporization device in accordance with the invention. The device is provided with a lubricant storage space 1 in which the lubricant is stored. The storage space 1 can be filled from outside, and this can be done either directly or via a connected feed line that renders possible a continuous replenishment. For the purposes of producing the lubricant vapour, the storage space (1) can be heated by means of an appropriate heating device to the typical range between 25 and 300° C., so that a defined equilibrium vapour pressure becomes established above the lubricant liquid. An appropriate temperature regulation mechanism can be used to maintain the vapour at a predetermined vapour pressure.

A tube-like transmission section 2, which can also be used as a storage container for already evaporated lubricant, leads the lubricant vapour to the exit openings 6a, through which it expands into an evacuated chamber for deposition on a target object. In front of the exit openings 6a there is also provided an additional closure mechanism 7, which could be, for example, a pneumatic valve operated by means of a valve rod 7a. This arrangement makes it possible to interrupt the flow of lubricant vapour, for example, whenever there is no target object in the vapour deposition chamber. When the valve 7 is in its closed position, the lubricant vapour in the transmission section 2 is then maintained at a defined vapour pressure, so at it will be immediately available opened again. With a view to avoiding condensation, it will be advantageous to provide heating also for the transmission section 2. When this is done, the temperature $T_{VV}$ of the transmission section wall should be slightly greater than the temperature $T_{VM}$ of the lubricant storage space 1, preferably producing a temperature difference of the order of 10° C.

With a view to assuring good heat transfer properties, the parts of the device in accordance with the invention that come into contact with the lubricant vapour are made of copper, alloy steel or some other suitable material. When selecting the material, care must be taen not to use any materials that could cause the decomposition of the lubricant (perfluoropolyether [HMW Zdol]) or possible admixed materials (X-IP). The admixed materials are preferably not heated at the same time as the lubricant, but should be deposited one after the other in a two-stage process, since their simultaneous deposition would give rise to an undesired distillation effect.

Figure 2:
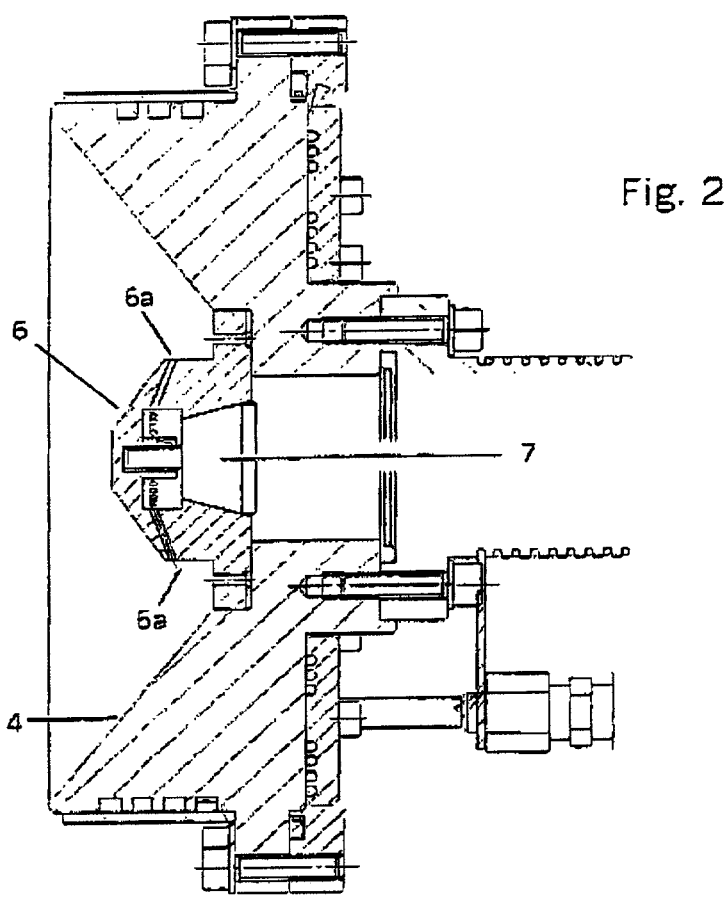
FIG. 2 shows a section through a part of the vacuum vaporization device illustrated in FIG. 1 drawn to a larger scale.

When the valve 2 is open, the lubricant vapour in the (storage or) transmission section 2 will eventually reach the distribution means 4 through the exit openings 6a. The exit area is shown to a larger scale in FIG. 2. The vapour passing through the open valve 7 issues from the exit openings 6a. The exit openings 6a are arranged in a valve cone 6 in such a manner as to make the vapour issue in the direction of the distribution means 4, which is here represented as a cone opening in the direction of the target object (not shown). The exit openings can be arranged right round the valve cone 6 in order to assure an even distribution of the lubricant vapour. Just like the transmission section 2 and the lubricant storage space 1, the cone 4 is heated in order to avoid condensation of the lubricant vapour. The temperature $T_{Vext}$ of the cone 4 should be greater than the temperature $T_{VV}$ of the transmission section 2 anll the preferred temperature difference is once again of the order of 10° C.

Figure 3:
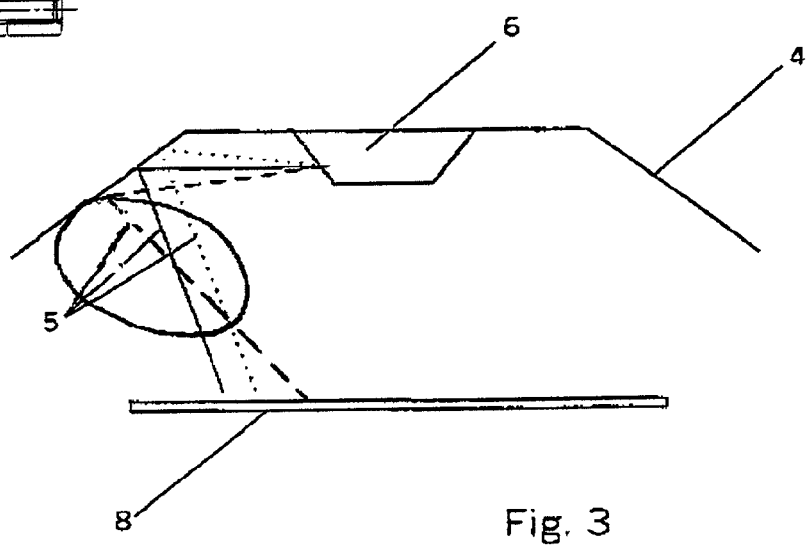
FIG. 3 shows a schematic representation of the principle that renders possible the production of a homogeneous lubricant distribution over the target object.

FIG. 3 provides a schematic representation of the principle underlying the production in accordance with the invention of a homogeneous distribution of the lubricant over the substrate 8. The angle of inclination of the vapour exit openings (not shown) determines the place where the vapour strewn 5 strikes the cone-shaped distribution element 4. Given a negative angle, i.e. an angle of incidence at which the vapour stream 5, prior to striking the distribution element 4, will have a direction component that points away from the target object, the distribution element 4 will be struck (dotted line) by the vapour stream 5 at a point that corresponds to a small cone radius. Given a positive angle, i.e. an angle of incidence at which the vapour stream 5, prior to striking the distribution element, already possesses a direction component that points towards the target object 8, the distribution element 4 till be struck (broken line) by the vapour stream 5 at a point that corresponds to a large code radius. The circle shown in the figure is intended to symbolize the so-called vapour lobe that becomes established. The vapour molecules are adsorbed when they strike the distribution element 4. Since the distribution element is heated, the high temperature assures that they will remain adsorbed on the surface of the distribution element 4 only for a very short time, after which thermal desorption will cause them to become "re-radiated" in the direction of the target object.

The distribution characteristic of the vapour over the target object 8 can be varied by an appropriate choice of the geometry—i.e. the angle of aperture—of the distribution element. The deposition rate distribution on the target object 8 can also be set via the geometry of the exit openings. With a view to obtaining a more homogenized distribution, exit openings with different angles of inclination may also be provided. For example, one could think of varying the angle of inclination of the exit openings and therefore also the angle at which the vapour stream is radiated, so as to render possible individual matching and/or adjustment for example, different diameters and the like—to the target objects that are to be coated wi bout having to effect any other modifications of the apparatus.

The invention is particularly suitable for such target objects as annular data storage disks, for example, hard disks and the like. The apparatus in accordance with the invention can be used to produce vapour-deposited layer thicknesses in the range between 1 and 5 nm, preferably between 1.5 and 3 nm, on large numbers of pieces, and layer inhomogeneities of less than 20%, namely about 10%—or even 8%—can be obtained when this is done. Vapour deposition rates of up to 1 nm/s are preferably used for this purpose, so that as many as 1000 disks can be coated in an hour.

The coating of a given target object can be simplified with the help of the present invention. To this end the coating rate is regulated via the temperature of the lubricant bath. The deposition time and therefore the coating thickness can then be set by means of a valve 7, so that discontinuous operation becomes possible. The special cone geometry can be used to obtain a uniform deposition rate over the target object. Whenever appropriate, moreover, the lubricant storage space 1 may be provided with an external feed line, so that the apparatus does not have to be opened or switched off before the lubricant can be replenished.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A vacuum vaporization device for applying a lubricant to a target object, comprising:
   lubricant supply means for supplying the lubricant including a lubricant storage space;
   a heating device for heating the lubricant storage space;
   vaporization setting means for setting at least one of a vapor pressure and a temperature of the lubricant;
   a transmission section for stating evaporated lubricant, said transmission section connected to the lubricant storage space;
   first heating means for heating said transmission section;
   a valve downstream from said transmission section, said valve contained within a valve body having at least one exit opening, said valve being operable between an open position for providing a supply of lubricant, and a closed position for interrupting the supply of lubricant;
   means for operating the valve between the open and closed positions, said means for operating extending through said lubricant storage space and said transmission section;
   a lubricant vapor distribution cone for distributing the lubricant vapor onto a target object that is to be coated therewith, said lubricant vapor distribution cone enclosing a substantially conical interior space having a wide end and a narrow end, the wide end positioned nearer to said target object than said narrow end and facing said target object for distributing said lubricant vapor onto said target object, said narrow end positioned nearer said transmission section than said wide end;
   wherein said valve body protrudes into said conical interior space;
   and including a second heating means for heating said lubricant vapor distribution cone.

2. A vacuum vaporization device in accordance with claim 1, wherein the lubricant supply means includes a cavity that can be filled from a location external to the lubricant supply means.

3. A vacuum vaporization device in accordance with claim 2, further comprising:
   an external lubricant feed line for filling the lubricant supply means.

4. A vacuum vaporization device in accordance with claim 1, wherein said valve body is a cone shaped element and the at least one exit opening is arranged laterally on said cone-shaped element.

5. A vacuum vaporization device in accordance with claim 1, wherein said vaporization setting means further includes a temperature sensor situated in the area of the lubricant supply means and being operable to set a desired vapor pressure.

6. A vacuum vaporization device in accordance with claim 1, wherein the transmission section includes a substantially tubular connecting element.

7. A vacuum vaporization device according to claim 1, wherein the vacuum vaporization device is operated to maintain a temperature $T_{vext}$ of the lubricant vapor distribution cone at a temperature greater than a temperature $T_{vv}$ of the transmission section and the temperature $T_{vv}$ of the transmission section at a temperature greater than a temperature $T_{vm}$ of the lubricant supply means.

8. A vacuum vaporization device in accordance with claim 7, wherein the vacuum vaporization device is further operated to maintain a first temperature difference $T_{vext} - T_{vv}$ of about 10° C. and maintain a second temperature difference $T_{vv} - T_{vm}$ of about 10° C.

9. A vacuum vaporization device in accordance with claim 1, wherein the temperature of the lubricant vapor distribution cone can be set between 25 and 300° C.

10. A vacuum vaporization device in accordance with claim 1, wherein an angle of inclination of the at least one exit opening can be varied with respect to said distribution means.

* * * * *

UNITED STATES PATENT AND TRADEMARK OFFICE
CERTIFICATE OF CORRECTION

| | | |
|---|---|---|
| PATENT NO. | : 7,155,115 B2 | Page 1 of 1 |
| APPLICATION NO. | : 10/119541 | |
| DATED | : December 26, 2006 | |
| INVENTOR(S) | : Bernhard Cord | |

It is certified that error appears in the above-identified patent and that said Letters Patent is hereby corrected as shown below:

Title Page item [30], Foreign Application Priority Data: please delete "102 11 573" and insert --102 11 573.7--.

Signed and Sealed this

Fifteenth Day of May, 2007

JON W. DUDAS
*Director of the United States Patent and Trademark Office*